United States Patent
In

(10) Patent No.: US 7,094,969 B1
(45) Date of Patent: Aug. 22, 2006

(54) SLIDING AND LOCKING SAFETY COVER FOR ELECTRICAL OUTLETS

(76) Inventor: Chanthim In, 311 Keeler Ct., San Jose, CA (US) 95139

( * ) Notice: Subject to any disclaimer, the term of this patent is extended or adjusted under 35 U.S.C. 154(b) by 0 days.

(21) Appl. No.: 11/224,342

(22) Filed: Sep. 12, 2005

(51) Int. Cl.
*H02G 3/14* (2006.01)

(52) U.S. Cl. .......................... 174/66; 174/67; 220/241

(58) Field of Classification Search ................ 174/66, 174/67; 220/241, 242
See application file for complete search history.

(56) References Cited

U.S. PATENT DOCUMENTS

| | | |
|---|---|---|
| 4,293,173 A | 10/1981 | Tricca |
| 4,950,842 A | 8/1990 | Menninga |
| D346,949 S | 5/1994 | Comerci et al. |
| 6,916,989 B1 * | 7/2005 | Broussard, Jr. ............. 174/66 |

FOREIGN PATENT DOCUMENTS

| | | |
|---|---|---|
| FR | 1220119 | 12/1958 |
| GB | 1198670 | 7/1970 |

* cited by examiner

*Primary Examiner*—Dhiru R. Patel
(74) *Attorney, Agent, or Firm*—Raymond M. Galasso; Galasso & Associates, LP

(57) ABSTRACT

An electrical outlet safety cover is provided that includes a sliding cover plate and spring-loaded catches to limit children's access to electrical outlets but to offer quick and easy access to users. The base plate on the safety cover replaces a conventional electrical outlet plate. It includes apertures for electrical outlets and for an attaching screw, and a top panel with two catches and a slot for an opposing catch. The vertical sides of the base plate fit into matching grooves on the vertical sides of a cover plate, which also includes a catch and slots for the catches on the base plate. When the catches are released, the cover plate can thus slide down the base plate, revealing the electrical outlets for use. To prevent access to the outlets, the cover plate can be slid up the base plate until all three catches securely lock.

10 Claims, 1 Drawing Sheet

SLIDING AND LOCKING SAFETY COVER FOR ELECTRICAL OUTLETS

FIELD OF THE DISCLOSURE

The present invention relates to safety devices for controlling access to electrical outlets and more particularly to an electrical outlet safety cover with a sliding and locking outer plate.

BACKGROUND

Electrical outlets for supplying electrical power to appliances and machines are common fixtures in homes and buildings. A persistent danger associated with electrical outlets is that children may insert their fingers or other objects into the openings of electrical outlets and be injured or killed or may cause injury to their surroundings. This is a particular risk when nothing is plugged into the openings of the outlets, making them inviting targets for children's curiosity.

Because of this danger, many safety devices have been created to limit children's access to the openings in these outlets. For example, plastic safety plugs with prongs that fit snugly into the openings are readily available on the market. Typically parents or other responsible persons insert the safety plugs into electrical outlets, and the plugs fit securely enough that small children have difficulty removing them from the openings with their fingers. Unfortunately one should never underestimate the resourcefulness of small children, who may remove safety plugs with scissors, knives, paperclips, or other tools and so place themselves in danger. Merely by being visible, safety plugs may themselves be taken as a challenge for removal by some children.

Other safety devices for electrical outlets are known in the art. For example, U.S. Pat. No. 4,950,842 for Menninga provides a base plate with apertures to replace the conventional face plate of an electrical outlet and a box-like outer cover that locks over the base plate, with openings for passage of an electric cord. A stop bar blocks access to the outlet by children, and the locks on the device are covered by the outer cover and can be released only by an external, magnetic force. Although this device offers substantial protection for children, it may be difficult and awkward to use in some circumstances. For example, a user may need to remove the outer cover quickly to insert a power cord but may not have the required magnetic force at hand.

Therefore there is a need for an electrical outlet safety cover with a sliding plate and spring-loaded catches to securely limit children's access to the empty openings in an electrical outlet but to offer quick and easy access to responsible users.

SUMMARY OF THE DISCLOSURE

The following explanation describes the present invention by way of example and not by way of limitation.

It is an aspect of the present invention to provide an electrical outlet safety cover with a sliding plate and spring-loaded catches to securely limit children's access to the empty openings in an electrical outlet but to offer quick and easy access to users.

These and other aspects of the present invention will become readily apparent upon further review of the following specification and associated drawings. In accordance with the present invention, an electrical outlet safety cover is provided that comprises a sliding cover plate and spring-loaded catches to limit children's access to electrical outlets but to offer quick and easy access to users. The base plate on the safety cover replaces a conventional electrical outlet plate. It comprises apertures for electrical outlets and for an attaching screw, and a top panel with two catches and a slot for an opposing catch. The vertical sides of the base plate fit into matching grooves on the vertical sides of a cover plate, which also comprises a catch and slots for the catches on the base plate. When the catches are released, the cover plate can thus slide down the base plate, revealing the electrical outlets for use. To prevent access to the outlets, the cover plate can be slid up the base plate until all three catches securely lock.

BRIEF DESCRIPTION OF THE DRAWINGS

The following embodiments of the present invention are described by way of example only, with reference to the accompanying drawings, in which.

DETAILED DESCRIPTION OF THE DRAWING FIGURES

The following description of drawings is offered to illustrate the present invention clearly. However, it will be apparent to those skilled in the art that the concepts of the present invention are not limited to these specific details. Also, commonly known elements are shown in diagrams for clarity, as examples only and not as limitations of the present invention.

The present invention comprises a sliding and locking safety cover for electrical outlets. In an embodiment, the safety cover is rectangular in shape, is approximately the size and dimensions of a conventional electrical outlet plate, and should be constructed of lightweight, durable materials, such as plastic.

Figure 1:
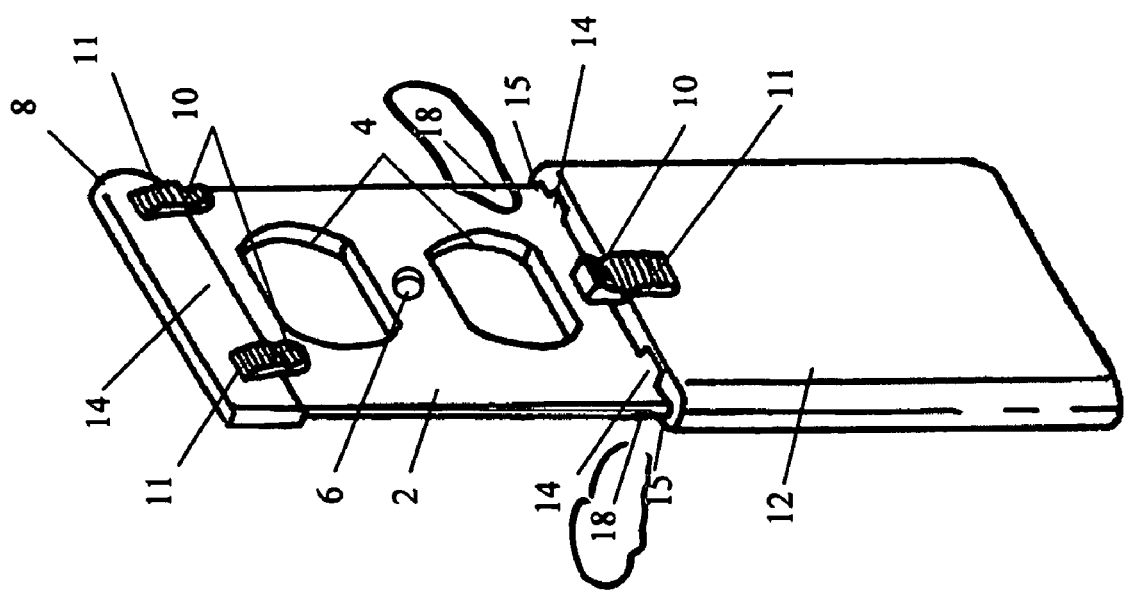
FIG. 1 is a perspective view of a sliding and locking safety cover for electrical outlets with the cover plate fully opened.

As shown in FIG. 1, the safety cover comprises the following elements:

A base plate 2,
Apertures 4 in the base plate 2 for electrical outlets,
An aperture 6 in the base plate 2 for an attaching screw,
A top panel 8 on the base plate 2,
A cover plate 12,
Spring-loaded safety catches 10 with finger-release devices 11 on the base plate 2 and cover plate 12,
Slots 14 in the base plate 2 and in the top panel 8 of the cover plate 12, and
Grooves 15 in the vertical sides of the cover plate 12.

Figure 2:
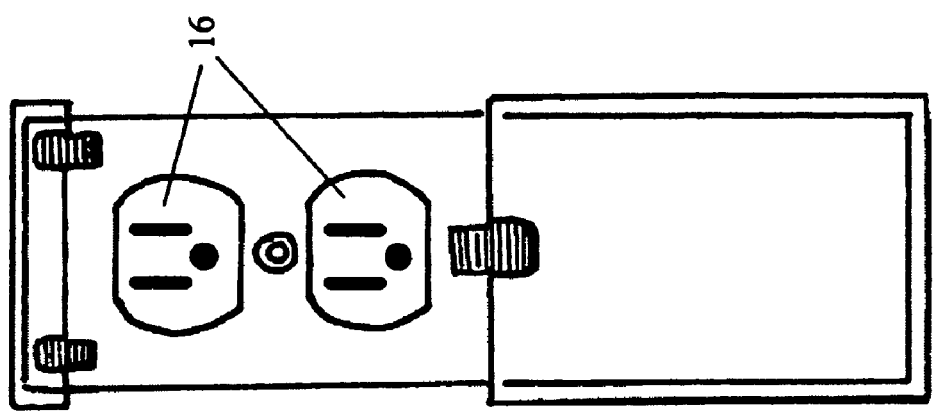
FIG. 2 is a perspective view of a sliding and locking safety cover mounted to an electrical outlet.

As shown in FIG. 2, the base plate 2 attaches over an electrical outlet 16 the way a conventional wall socket plate attaches over a wall socket. Returning to FIG. 1, the base plate 2 comprises apertures 4 that fit over electrical outlets and another aperture 6 through which a screw may be inserted to attach the base plate 2 to a surface.

In an embodiment, a top panel 8 on the base plate 2 comprises two spring-loaded safety catches 10 with finger-release devices 11, well known in the art, and a slot 14. In other embodiments few or more catches 10 and slots 14 may be used.

The cover plate 12 is designed to slide over the base plate 2 and snap into a locking position. In an embodiment, it comprises two slots 14 and a spring-loaded catch 10 a finger-release device 11. In other embodiments few or more catches 10 and slots 14 may be used. Each vertical side of the cover plate 12 has a groove 15 designed to fit over a vertical side 18 of the base plate 2, so that the cover plate 12 can slide up and down the base plate 2.

Figure 3:
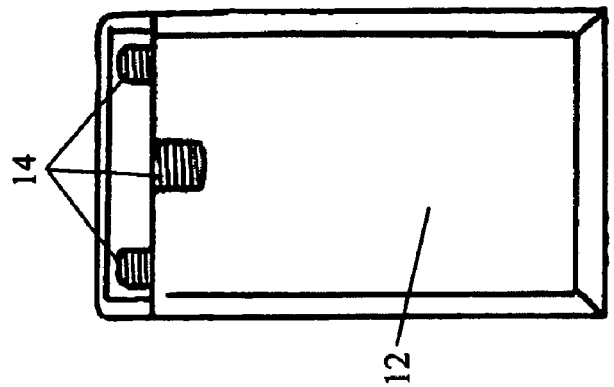
FIG. 3 is a perspective view of a sliding and locking safety cover for electrical outlets with the cover plate fully closed.

When the cover plate 12 is slid fully upward, the catches 10 on the top panel 8 of the base plate 2 are inserted into the matching slots 14 on the cover plate 12, and the catch 10 on the cover plate 12 is inserted into the matching slot 14 on the top panel 8. All three spring-operated catches 10 then lock into the slots 14. The combination of three separate catches that are spring loaded and require some force and coordination to open make the cover plate 12 particularly difficult for children to open. However, users can press the exposed finger-release devices 11 on the catches 10 to quickly release the catches 10 and slide the cover plate 12 down to expose the electrical outlets for use. As shown in FIG. 3, the cover plate 12 completely covers the electrical outlets when the cover plate 12 is closed, to effectively limit access to the outlets by children.

In another embodiment, each vertical side 18 of the base plate 12 may have a tongue that fits into a groove 15 on each vertical side 18 of the cover plate 12, so that the cover plate 12 may be slid up and down.

Use

The employ the safety cover, the user chooses an appropriate electrical outlet and removes the conventional plate by removing the attaching screw. The user then attaches the safety cover's base pate 2, shown in FIG. 1, to the surface underneath by inserting a screw through the central aperture 6, so that the apertures 4 fit over the outlets. To limit children's access to the electrical outlets, the user slides the cover plate 12 upward so that all the catches 10 lock in their matching slots 14 and the outlets are completely covered by the cover plate 12.

To attach power cords to the electrical outlets subsequently, the user presses against the finger-release devices 11 on the spring-loaded catches 10 so that the catches 10 are released from the slots. The user can then slide the cover plate 12 down until the electrical outlets are exposed.

The best dimensional relationships for the parts of the invention described above, including variations in form and use, will be readily apparent to those skilled in the art, and are intended to be encompassed by the present invention.

What is claimed is:

1. An electrical outlet safety cover, comprising
   an apertured base plate to replace the conventional face plate on an electrical outlet, the base plate comprising
      a top panel that matches the dimensions of a cover plate such that the top panel and cover plate join when the cover plate is in the closed position to limit access to the electrical outlet;
   a cover plate that in the closed position substantially covers the base plate;
   a sliding means, such that the cover plate can be slid along the vertical edges of the base plate; and
   a locking means, comprising at least one spring-loaded catch with a finger release mounted on the top panel of the base plate;
      at least one slot on the top panel of the base plate;
      at least one spring-loaded catch with a finger release mounted on the cover plate, such that at least one spring-loaded catch with a finger release on the cover plate fits lockably into at least one slot on the top panel of the base plate; and
      at least one slot on the cover plate, such that at least one slot on the cover plate fits lockably over at least one spring-loaded catch with a finger release on the top panel of the base plate.

2. The base plate of claim 1, wherein the base plate comprises
   at least one aperture that may be placed over an electrical outlet, and
   at least one aperture through which a screw may be inserted.

3. The aperture that may be placed over an electrical outlet of claim 2, wherein the aperture that may be placed over an electrical outlet comprises two apertures that may be placed over the two sockets on a conventional electrical outlet.

4. The sliding means of claim 1, wherein the sliding means comprises
   a groove on each vertical edge of the cover plate such that each vertical edge of the base plate can be fit into a groove on the cover plate, and
   the cover plate can be slid along the vertical edges of the base plate.

5. The sliding means of claim 1, wherein the sliding means comprises
   a groove on each vertical side of the base plate such that a tongue on each vertical edge of the cover plate can be fit into a groove on the base plate, and
   the cover plate can be slid along the vertical edges of the base plate.

6. An electrical outlet safety cover, comprising
   an apertured base plate to replace the conventional face plate on an electrical outlet; the base plate comprising
      a top panel that matches the dimensions of a cover plate such that the top panel and cover plate join when the cover plate is in the closed position to limit access to the electrical outlet,
      at least one aperture that may be placed over an electrical outlet, and
      at least one aperture through which a screw may be inserted;
   a cover plate that in the closed position substantially covers the base plate;
   a sliding means, such that the cover plate can be slid along the vertical edges of the base plate; and
   a locking means for locking the cover plate to the base plate such that the cover plate can be locked into a closed position that substantially covers the electrical outlet, the locking means comprising
      two spring-loaded catches with finger releases mounted on the top panel of the base plate;
      one slot on the top panel of the base plate;
      one spring-loaded catch with a finger release mounted on the cover plate, such that the spring-loaded catch on the cover plate fits lockably into the slot on the top panel of the base plate; and
      two slots on the cover plate, such that the slots on the cover plate fit lockably over the spring-loaded catches with finger releases on the top panel of the base plate.

7. The aperture that may be placed over an electrical outlet of claim 6, wherein the aperture that may be placed over an electrical outlet comprises two apertures that may be placed over the two sockets on a conventional electrical outlet.

8. The sliding means of claim 6, wherein the sliding means comprises
   a groove on each vertical edge of the cover plate such that each vertical edge of the base plate can be fit into a groove on the cover plate, and the cover plate can be slid along the vertical edges of the base plate.

9. The sliding means of claim 6, wherein the sliding means comprises
  a groove on each vertical side of the base plate such that
    a tongue on each vertical edge of the cover plate can be fit into a groove on the base plate, and
    the cover plate can be slid along the vertical edges of the base plate.

10. An electrical outlet safety cover, comprising
  an apertured base plate to replace the conventional face plate on an electrical outlet; the base plate comprising
    a top panel that matches the dimensions of a cover plate such that the top panel and cover plate join when the cover plate is in the closed position to limit access to the electrical outlet;
    two apertures that may be placed over the two sockets on a conventional electrical outlet; and
    an aperture through which a screw may be inserted;
  a cover plate that in the closed position substantially covers the base plate, the cover plate comprising a groove on each vertical side such that
    each vertical edge of the base plate can be fit into a groove on the cover plate, and
    the cover plate can be slid along the vertical edges of the base plate;
  a locking means for locking the cover plate to the base plate such that the cover plate can be locked into a closed position that fully covers the electrical outlet, the locking means comprising
    two spring-loaded catches with finger releases mounted on the top panel of the base plate;
    a slot on the top panel of the base plate;
    a spring-loaded catch with a finger release mounted on the cover plate, such that the spring-loaded catch on the cover plate fits lockably into the slot on the top panel of the base plate; and
    two slots on the cover plate, such that the slots on the cover plate fits lockably over the spring-loaded catches on the top panel of the base plate.

* * * * *